(12) United States Patent
Salter et al.

(10) Patent No.: US 10,822,842 B2
(45) Date of Patent: Nov. 3, 2020

(54) ADAPTIVE DOOR SEALING USING POWER CINCHING LATCH

(71) Applicant: FORD GLOBAL TECHNOLOGIES, LLC, Dearborn, MI (US)

(72) Inventors: Stuart C. Salter, White Lake, MI (US); Ronald J. Collins, Dearborn, MI (US); Aaron M. Halonen, Brighton, MI (US); David Brian Glickman, Southfield, MI (US); Paul K. Dellock, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 121 days.

(21) Appl. No.: 16/288,637

(22) Filed: Feb. 28, 2019

(65) Prior Publication Data

US 2020/0277810 A1    Sep. 3, 2020

(51) Int. Cl.
*E05B 77/54* (2014.01)
*E05B 81/12* (2014.01)
*E05B 81/64* (2014.01)
*G01H 1/12* (2006.01)
*B60H 1/00* (2006.01)
(Continued)

(52) U.S. Cl.
CPC .............. *E05B 77/54* (2013.01); *E05B 81/12* (2013.01); *E05B 81/64* (2013.01); *G01H 1/12* (2013.01); *B60H 1/00764* (2013.01); *B60H 1/00807* (2013.01); *B60J 10/50* (2016.02); *B60W 2520/105* (2013.01); *E05B 77/36* (2013.01)

(58) Field of Classification Search
CPC .......... E05B 77/54; E05B 81/12; E05B 81/64; E05B 77/36; G01H 1/12; B60J 10/50; B60H 1/00764; B60H 1/00807; B60W 2520/105
See application file for complete search history.

(56) References Cited

U.S. PATENT DOCUMENTS

| 4,026,598 A | 5/1977 | Koike |
| 4,945,681 A | 8/1990 | Nozaki et al. |

(Continued)

FOREIGN PATENT DOCUMENTS

| EP | 0397300 A2 | 2/1990 |
| JP | S61295126 A | 12/1986 |
| WO | 2007004810 A1 | 1/2007 |

*Primary Examiner* — Hussein Elchanti
(74) *Attorney, Agent, or Firm* — David Coppiellie; MacMillan, Sobanski & Todd, LLC

(57) ABSTRACT

The invention controls a power cinching function of a motor vehicle door latch in order to improve door seal performance under conditions wherein vibrations could otherwise reduce seal effectiveness. With the door latched closed in a flush condition, the vehicle speed is compared to a slow-speed threshold. When the vehicle speed is greater than the slow-speed threshold, then a vehicle vibration parameter is compared to a vibration threshold. When the vibration parameter is greater than the vibration threshold, then the power cinching function is activated to move the door to to a subflush condition which increases a compression of the seal between the door and a vehicle door frame. When the door is in the subflush condition, the vehicle speed continues to be compared to the slow-speed threshold, and when the vehicle speed is less than the slow-speed threshold then the door is released back to the flush condition.

18 Claims, 6 Drawing Sheets

(51) Int. Cl.
  *B60J 10/50*  (2016.01)
  *E05B 77/36*  (2014.01)

(56) References Cited

U.S. PATENT DOCUMENTS

| | | | |
|---|---|---|---|
| 5,355,628 A | | 10/1994 | Dranchak |
| 6,095,553 A | * | 8/2000 | Chou ................. B60R 21/0132 280/730.2 |
| 6,183,040 B1 | * | 2/2001 | Imaizumi ............ H02H 7/0851 296/155 |
| 9,428,943 B2 | | 8/2016 | Mitchell et al. |
| 2011/0260848 A1 | * | 10/2011 | Rodriguez Barros . B60Q 1/323 340/438 |
| 2014/0049058 A1 | * | 2/2014 | Kudoh ................... E05B 79/06 292/336.3 |
| 2016/0186468 A1 | | 6/2016 | Ilea |
| 2016/0290019 A1 | * | 10/2016 | Nagata ................... E05B 77/06 |
| 2017/0089114 A1 | * | 3/2017 | Rider ................... G01L 19/083 |
| 2017/0107747 A1 | | 4/2017 | Dente et al. |
| 2019/0168592 A1 | * | 6/2019 | Baskar ................... B60J 10/40 |

* cited by examiner

ADAPTIVE DOOR SEALING USING POWER CINCHING LATCH

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to latching and sealing for doors of a motor vehicle, and, more specifically, to a power cinching door latch for adaptively increasing a compression load deflection of a door seal to maintain sealing under turbulent vehicle driving conditions.

Automotive weather-stripping is used to obtain sealing around the periphery of each movable door that covers an opening to a vehicle passenger compartment (e.g., passenger doors and liftgates). The seals are commonly made of extruded EPDM rubber, a thermoplastic elastomer (TPE) mix of plastic and rubber, or a thermoplastic olefin (TPO) polymer/filler blend. The sealing properties of the weather strip are impacted by outside temperature and other factors. Many vehicles use an omega-shaped primary bulb with a force displacement curve adapted to achieve good sealing characteristics while avoiding any need to apply excessive force to close the door or any "springing open" of the door when it is opened. Thus, the materials and dimensions of the weather-stripping bulb are designed according to desired compression load deflection (CLD) and sound transmission loss (STL) properties which achieve the necessary environmental sealing and exclusion of road and wind noise.

An automobile body will flex in response to outside forces during driving (e.g., when going over bumps). The resulting vibrations cause relative motions between the body and movable parts such as door assemblies. Differences between interior/exterior air pressures may combine with the vibrations to cause the weather-stripping seal to lose effectiveness (i.e., leak). Use of a sealing bulb having a greater spring force (i.e., higher CLD) would increase the ability of the seal to remain in contact with the door and the door frame as they vibrate (thereby more effectively dampening the door vibrations and preventing leakage) but would result in undesirable forces during closing and opening of the door.

For aesthetic purposes and to maintain the appearance of a quality product, it is very important that when a door is latched at its closed position its edges should be flush with the surrounding exterior surfaces of the vehicle. While primarily controlled by the design and installation of the door assembly hinges and the latching mechanism, the CLD of the weather-stripping must also be within a desired range in order to reliably obtain the desired flushness.

SUMMARY OF THE INVENTION

In one aspect of the invention, apparatus in a vehicle includes a door frame defining an opening. A door assembly is movably mounted for selectably moving between an open state and a closed state with respect to the opening. A seal is mounted to one of the door frame or door assembly which is compressed between the door frame and door assembly in the closed state. A door latch is configured to capture the door assembly and having a power cinching mode to pull the door assembly into the closed state. A controller is configured to monitor a speed of the vehicle and a vibration parameter of the vehicle. The controller is coupled to the door latch to selectably activate the power cinching mode. The door latch has a nominal latched state in which the door assembly is in a flush condition with respect to the opening and has a subflush latched state in which the power cinching mode pulls the door assembly into a subflush condition with an increased compression of the seal. The controller activates the subflush latched state when the monitored speed is greater than a slow-speed threshold and the vibration parameter is greater than a vibration threshold. Then the controller deactivates the subflush state when the monitored speed is less than the slow-speed threshold.

DETAILED DESCRIPTION OF PREFERRED EMBODIMENTS

Based on the availability of power-cinching door latches for automatic latching during the closing of vehicle doors (e.g., passenger door and liftgates), the invention capitalizes on the ability to pull the door to a subflush condition under certain conditions, thereby increasing a closing force on the door and improving performance of the weather-stripping seal. In a preferred embodiment, the shape of the seal is modified so that when the door is pulled subflush then the spring force rises significantly, thus ensuring a better seal.

Figure 1:
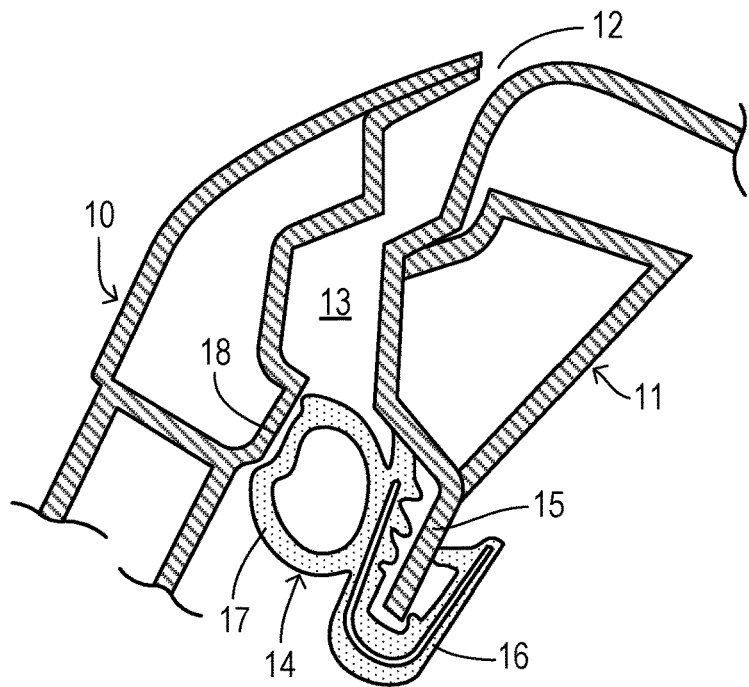
FIG. 1 is a cross-sectional diagram showing a conventional door seal between a vehicle door and door frame.

Referring to FIG. 1, a door assembly 10 is shown in a closed state occupying an opening defined in a vehicle/door frame 11. An edge of door assembly 10 forms a door gap 12 with frame 11, and a cavity 13 is formed between door assembly 10 and frame 11. A weather-stripping seal 14 is mounted on a flange 15 of frame 11. It is also a well-known in practice to have the weather strip retained on the door assembly. Seal 14 includes a push-on mounting channel 16 and a bulb 17 protruding from a side of channel 16. Channel 16 may include internal fingers for grasping flange 15 and may also include a steel core as commonly used in the art. Bulb 17 has a tubular shape and is arranged to be compressed between a bearing surface 18 of door assembly 10 and flange 15.

Figure 2:
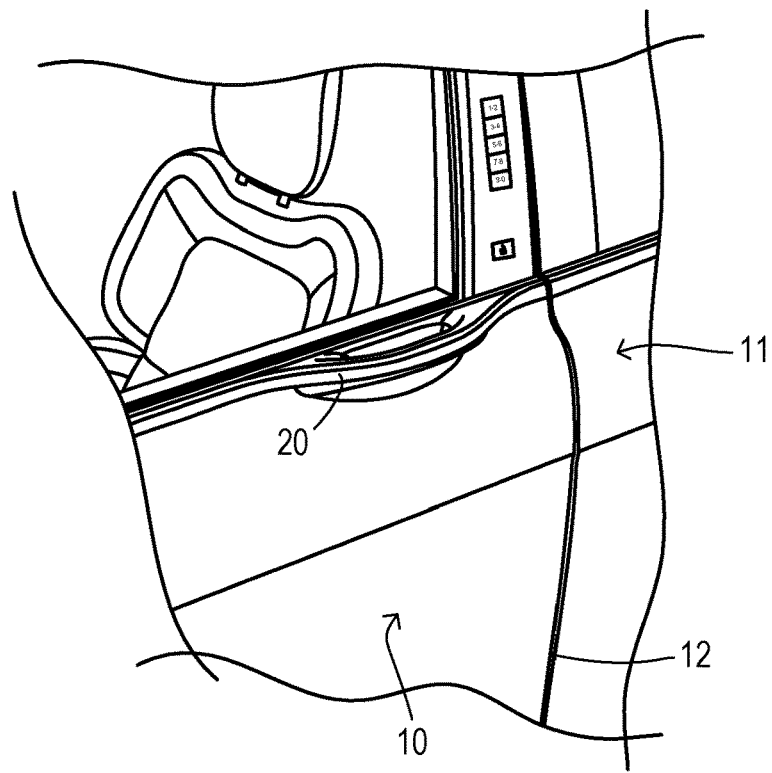
FIG. 2 is a perspective view of a vehicle door with a power-cinching electronic door latch wherein the door is flush with a surrounding door opening.

FIG. 2 shows an exterior view of a vehicle wherein door assembly 10 is separated by gap 12 from a surrounding frame 11 while in a flush condition. As used herein, the surrounding frame may include an adjoining sheet-metal body panel or other structures defining a door opening. FIG. 2 shows an electronic latching system wherein a fixed handle 20 with no moving parts can be grasped during closing to move door assembly toward a closed state. Once a predetermined position is reached which allows a latch mechanism on the door frame to capture a corresponding latch structure on the door, then the power cinching function of an electronic latch may take over the closing operation by pulling door assembly 10 into the flush condition and then engaging engaging the mechanical latch such that the door is retained in the closed state.

Figure 3:
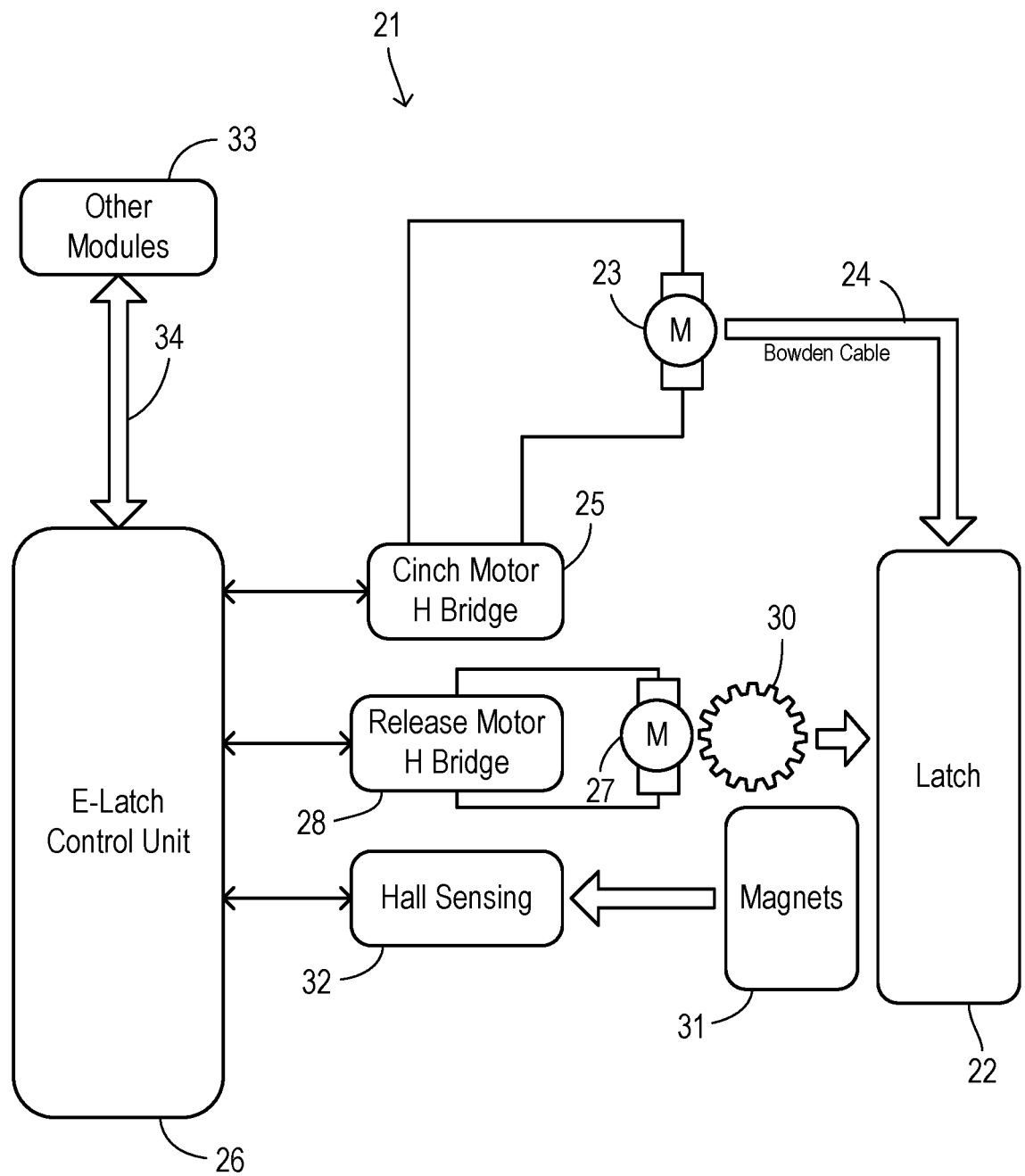
FIG. 3 is a block diagram showing an electronic latching system with power cinching according to the present invention.

FIG. 3 shows one embodiment of a door latching system 21 employing a power cinching latch system wherein the power cinching function is adaptively controlled to increase seal compression during conditions having a tendency to cause a break in the sealing. A mechanical latch 22 with known structures, including operable components for creating a powered closing movement, performs a power cinching function using a cinch motor 23 coupled to latch 22 by a linkage 24, such as a Bowden cable. Cinch motor 23 is driven by a bridge 25 under control of a latch control unit 26. For unlatching latch 22 when the door is to be opened, a release motor 27 is driven by a motor bridge 28 also under control of latch control unit 26. A gear 30 links motor 27 with latch 22 for releasing latch 22 in a known manner. Latch 22 may for example have a ratchet mechanism that is selectively rotatable with respect to a striker fixed to the door in order to latch and unlatch the door. A pawl is provided that selectively engages the ratchet to prevent the ratchet from rotating. Gear 30 may drive the pawl between engaged and disengaged positions.

Monitoring of the positions of the latch components and the door itself may be accomplished with various magnets 31 disposed on various latch components and detected by a block of Hall-effect sensors 32. Corresponding position signals are provided to latch control unit 26 to perform controlled movements including using a power cinching mode to pull the door assembly into a subflush condition. In particular, latching system 21 has A) a nominal latched state in which the door assembly is in a flush condition with respect to the door opening, and B) a subflush latched state in which the power cinching mode pulls the door assembly into a subflush condition with an increased compression of the weather-stripping seal. As explained in greater detail below, latch control unit 26 activates the subflush latched state when a monitored speed of the vehicle is greater than a slow-speed threshold and a vibration parameter (which characterizes the likelihood of vibrations severe enough to allow the seal to leak) is greater than a vibration threshold. Preferably, the subflush latched state is maintained continuously (to avoid excessive wear of the power cinching components) until latch controller 26 deactivates the subflush state in response to detecting that the monitored vehicle speed is less than the slow-speed threshold. The vibration parameter(s) may include vertical acceleration of the vehicle, ambient temperature, vehicle speed, or other sensed variables, the current values of which may be obtained from other vehicle electronic modules or sensors 33 via a communication bus 34, for example.

Figure 4:
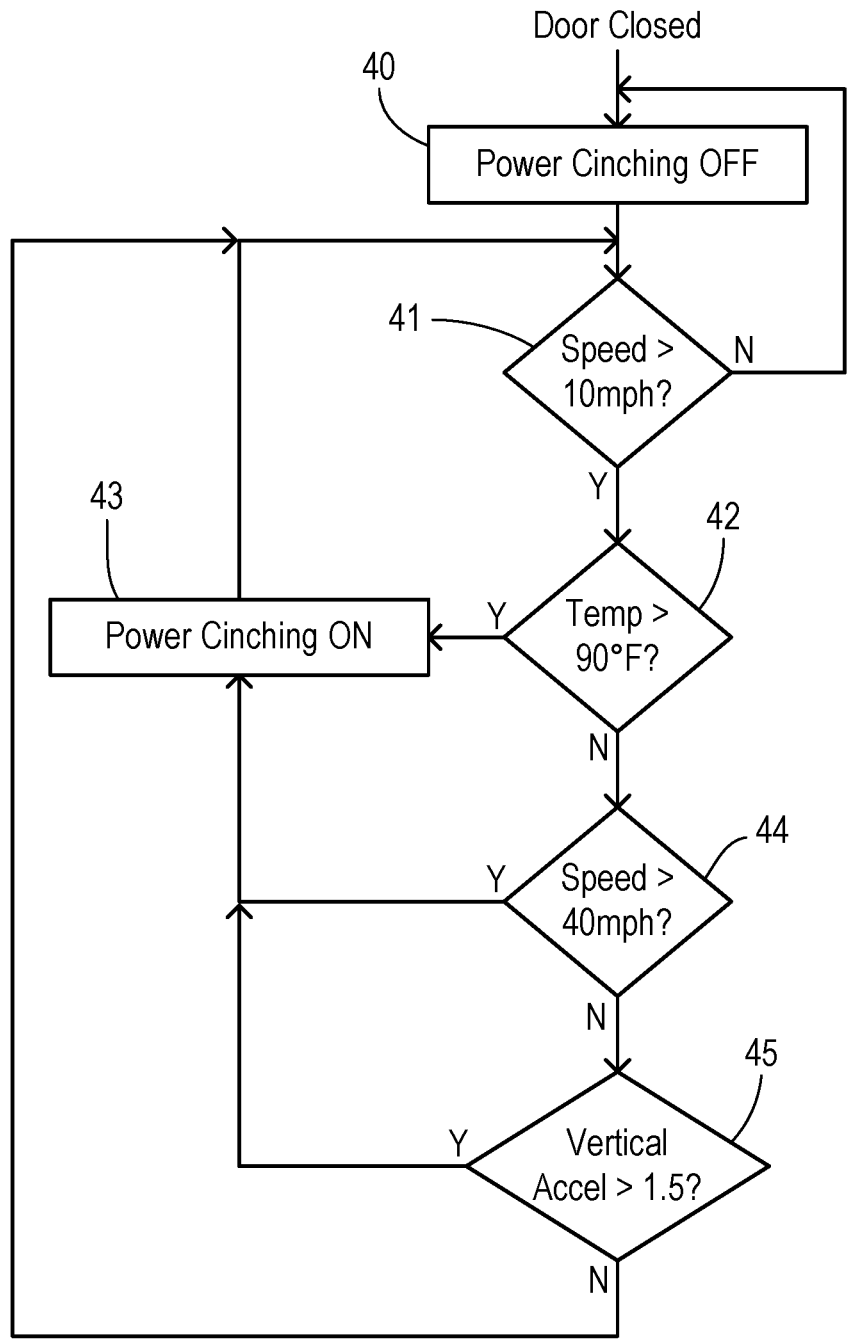
FIG. 4 is a cross section showing a vehicle door in a flush condition.

FIG. 4 shows a preferred method of the invention as performed during each drive cycle of the vehicle. Initially, the vehicle door is moved into (or remains in) a closed state. The door is in a latched state, and the power cinching function is inactive (e.g., turned off) in step 40. To ensure that the exterior appearance of the vehicle with the door in the closed position remains acceptably flush whenever the exterior can be readily seen by observers, the invention uses a low-speed threshold below which the subflush condition is not employed. Thus, a check is made in step 41 to determine whether a vehicle speed (e.g., as obtained from a powertrain control module) is greater than the low-speed threshold. The threshold may preferably have a value within a range of about 5 mph to about 20 mph, with a most preferred value of about 10 mph. If vehicle speed is not greater than the threshold, then a return is made to step 40 wherein the power cinching function remains (or is switched to) off.

To evaluate the conditions wherein the door seal may tends to leak due to vibrations, typical parameters that may be usefully employed include 1) vertical acceleration (e.g., as measured within a vehicle suspension or in a passenger restraint module) which is used to indicate whether the vehicle is driving over a bumpy or uneven surface, 2) ambient temperature which may provide an indication at higher temperatures that the spring force of the weather-stripping seal may be reduced due to softening of its component material, thereby allowing seal leakage to occur in response to relatively smaller vibrations, and 3) vehicle speed being above a higher speed threshold which is positively correlated to increased vibrations and also associated with higher air pressure differentials which also leads to additional leakage.

When vehicle speed is greater than the low speed threshold, then the vibration parameters are compared to respective vibration thresholds in order to detect the existence of conditions likely to result in seal leakage. Thus, in step 42, an ambient temperature (which may be received from a powertrain controller or a climate control system) is compared with a temperature threshold. The temperature threshold may preferably have a value within a range of about 85° F. to about 95° F., with the most preferred value of about 90° F. If the temperature is greater than the temperature threshold, then the power cinching mode is activated in step 43 to pull the door assembly into the subflush condition. If the temperature is not greater than the temperature threshold, then a check is performed in step 44 to determine whether the vehicle speed is greater than a high-speed threshold. The high-speed threshold may preferably have a value within a range of about 35 mph to 45 mph, with a most preferred value of about 40 mph. If vehicle speed is higher than the threshold, then the power cinching mode is activated in step 43. Otherwise, a check is performed in step 45 to determine whether vehicle vertical acceleration is greater than an acceleration threshold. The acceleration threshold may have a preferred value within a range of about 1.3 m/s$^2$ to about 1.7 m/s$^2$, with the preferred value of about 1.5 m/s$^2$. When the vertical acceleration is greater than the threshold, then the power cinching mode is activated in step 43. If none of the vibration parameters in steps 42, 44, and 45 are greater than the corresponding threshold, then the method returns to step 41 to continue monitoring vehicle speed against the low-speed threshold. Likewise, after activating the power cinching mode in step 43, the method continues to monitor vehicle speed in step 41, so that regardless of whether the door has been pulled to the subflush condition the door assumes the flush condition any time that vehicle speed drops below the low-speed threshold.

Figure 5:
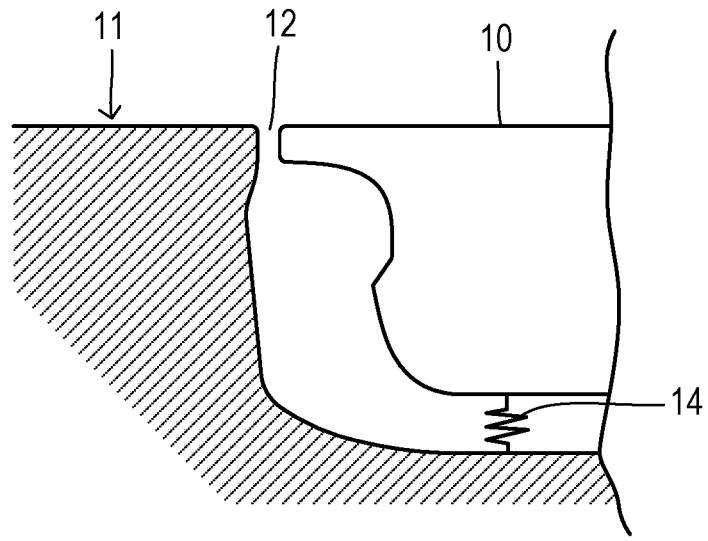
FIG. 5 is a cross section showing the door of FIG. 4 in a subflush condition.
Figure 6:
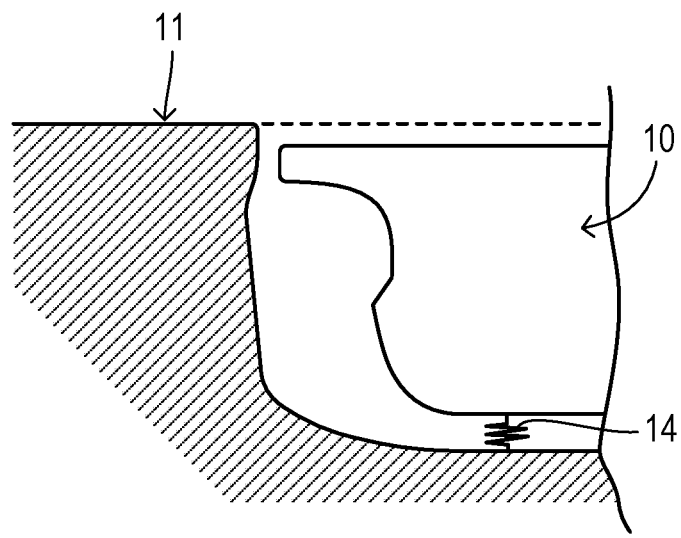
FIG. 6 is a flowchart showing one preferred embodiment of the invention.

The flush and sub flush conditions are shown in greater detail in FIGS. 5 and 6, respectively. When door 10 is in the flush condition shown in FIG. 5, weather-stripping seal 14 is compressed to a degree that provides a first compression load deflection (CLD) which gives a desired performance for opening and closing of the door. In the subflush condition shown in FIG. 6, weather-stripping seal 14 is additionally compressed as a result of the door assembly 10 being pulled farther inward, thereby producing a subflush CLD having a significantly higher value than the first CLD. Seal 14 preferably has a configuration which generates an increasing rate of change in the CLD after seal 14 becomes compressed beyond the flush condition.

Figure 7:
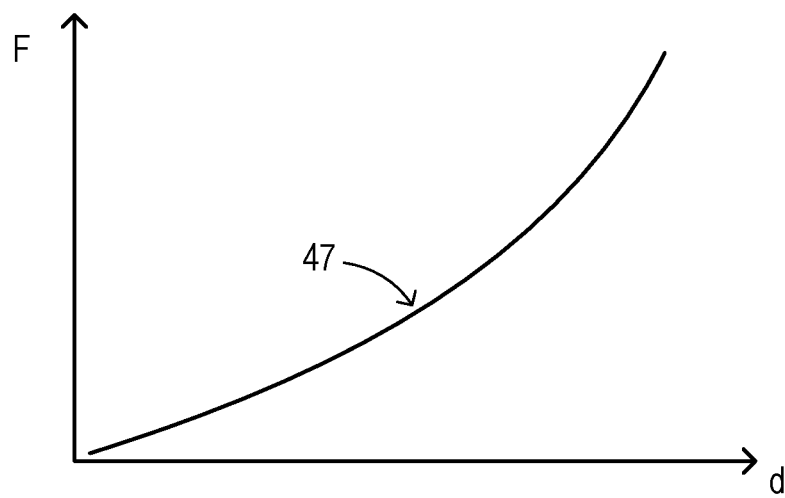
FIG. 7 is a graph showing a force vs. displacement curve for a prior art door seal.
Figure 8:
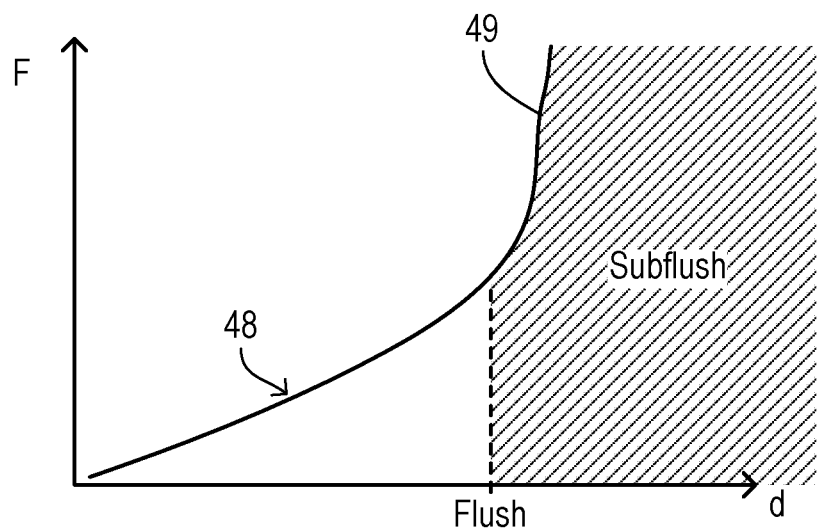
FIG. 8 is a graph showing a force vs. displacement curve for a door seal according to one preferred embodiment of the invention.
Figure 9:
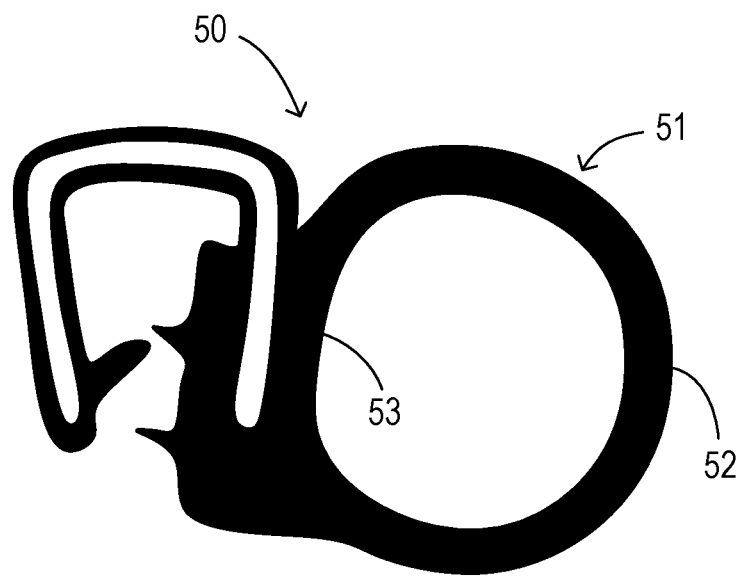
FIG. 9 is a cross section of a prior art weather-strip seal.

Modifications to the weather-stripping seal can be made to further improve performance when the door is subflush. FIG. 7 shows a force versus displacement curve 47 for a prior art configuration of a sealing bulb of a weather-stripping (FIG. 9). As a compression distance increases during closing of the door, the force (i.e., compression load deflection) gradually increases, with no special difference between the rate of change of the force after the door is pulled to the subflush condition. By modifying the shape or materials of the bulb seal, a modified force versus displacement curve 48 is obtained as shown in FIG. 8 for use in the invention. Substantially the same rate of change in the force is obtained during initial closing of the door and up until the closing distance reaches the flush condition. Afterwards, a section 49 of the curve is reached which provides a higher rate of change (i.e., slope) when the compression distance d reaches a subflush range. In practice, the incremental distance from the flush to the subflush position is only about 1 to 3 mm in order to obtain an increase in the CLD that is sufficient to better seal out exterior noise and to damp door vibrations/movements.

FIG. 9 shows the weather-strip seal 50 which provides the force displacement curve shown in FIG. 7. Seal 50 has a primary bulb portion 51 with a contact side 52 and a base side 53. Bulb 51 has a substantially uniform thickness resulting in the gradual rate of increase in the CLD shown in FIG. 7.

Figure 10:
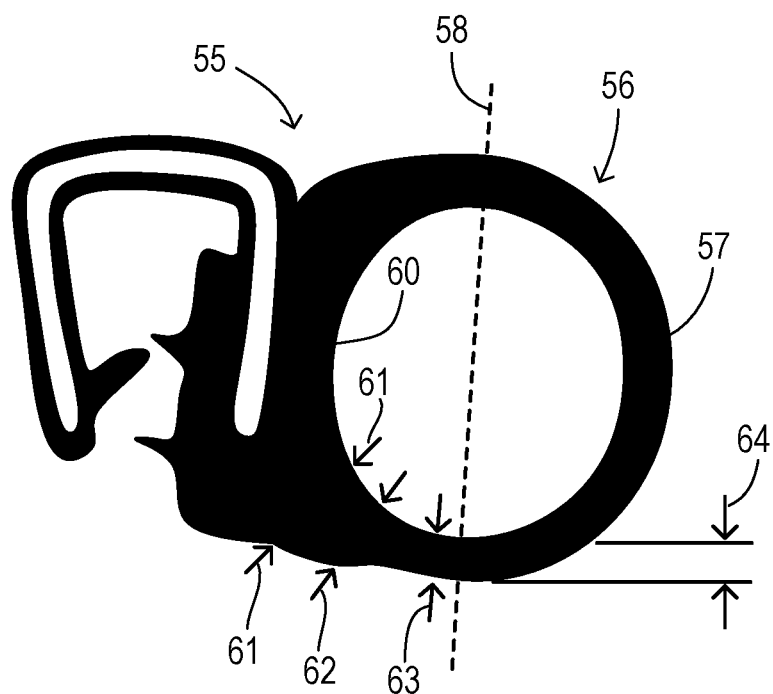
FIG. 10 is a cross section of one preferred embodiment of a weather-strip seal of the invention.

FIG. 10 shows a modified seal 55 adapted to produce a force versus displacement curve of the type shown in FIG. 8. A primary bulb 56 has a contact side 57 to the right of a centerline 58 and has a base side 60 to the left of centerline 58. During closing of the door, contact side 57 is the first to be displaced as the seal becomes compressed between the door and the door frame. Contact side 57 has a substantially uniform thickness 64 to provide a gradual increase in load deflection. Base side 60 has a greater thickness which tapers from a largest thickness 61 farthest from the contact side through gradually decreasing thicknesses 62 and 63 tapering toward contact side 57. As a greater deflection of bulb 56 occurs during the pulling of the door to the subflush condition, the deforming portions of bulb 56 gradually approach the thicker sections on base side 60, resulting in the increased rate of change in the CLD.

What is claimed is:

1. Apparatus in a vehicle, comprising:
a door frame defining an opening;
a door assembly movably mounted for selectably moving between an open state and a closed state with respect to the opening;
a seal mounted to one of the door frame or door assembly which is compressed between the door frame and door assembly in the closed state;
a door latch configured to capture the door assembly and having a power cinching mode to pull the door assembly into the closed state; and
a controller configured to monitor a speed of the vehicle and a vibration parameter of the vehicle, and wherein the controller is coupled to the door latch to selectably activate the power cinching mode;
wherein the door latch has a nominal latched state in which the door assembly is in a flush condition with respect to the opening and has a subflush latched state in which the power cinching mode pulls the door assembly into a subflush condition with an increased compression of the seal; and
wherein the controller activates the subflush latched state when the monitored speed is greater than a slow-speed threshold and the vibration parameter is greater than a vibration threshold; and
wherein the controller deactivates the subflush state when the monitored speed is less than the slow-speed threshold.

2. The apparatus of claim 1 wherein after the controller activates the subflush latched state, then the subflush latched state is maintained until the monitored speed is less than the slow-speed threshold.

3. The apparatus of claim 1 wherein the slow-speed threshold has a value within a range of 5 mph to 20 mph.

4. The apparatus of claim 1 wherein the vibration parameter is comprised of the monitored speed, and wherein the vibration threshold is comprised of a high-speed threshold which is larger than the slow-speed threshold.

5. The apparatus of claim 4 wherein the high-speed threshold has a value within a range of 35 mph to 45 mph.

6. The apparatus of claim 1 wherein the vibration parameter is comprised of an ambient temperature, and wherein the vibration threshold is comprised of a temperature threshold.

7. The apparatus of claim 6 wherein the temperature threshold has a value within a range of 85° F. to 95° F.

8. The apparatus of claim 1 wherein the vibration parameter is comprised of a vertical acceleration of the vehicle, and wherein the vibration threshold is comprised of an acceleration threshold.

9. The apparatus of claim 8 wherein the acceleration threshold has a value within a range of 1.3 m/s$^2$ to 1.7 m/s$^2$.

10. The apparatus of claim 1 wherein the seal comprises a tubular primary bulb which compresses between the door assembly and door frame, wherein the primary bulb has a contact side with a first thickness for providing a flush compression load deflection when the door assembly closes to the nominal latched state, wherein the primary bulb has a base side having a second thickness that tapers to the first thickness toward the contact side for providing a subflush compression load deflection having an increasing rate of change as the door assembly is pulled into the subflush condition.

11. A method of controlling a power cinching function of a door latch for a door of a vehicle, comprising the steps of:
when a door is latched closed in a flush condition, comparing a vehicle speed to a slow-speed threshold;
when the vehicle speed is greater than the slow-speed threshold, comparing a vehicle vibration parameter to a vibration threshold;
when the vibration parameter is greater than the vibration threshold, activating the power cinching function to move the door to a subflush condition which increases a compression of a seal between the door and a door frame of the vehicle;
when the door is in the subflush condition, comparing the vehicle speed to the slow-speed threshold; and
when the vehicle speed is less than the slow-speed threshold, releasing the door back to the flush condition.

12. The method of claim 11 wherein the slow-speed threshold has a value within a range of 5 mph to 20 mph.

13. The method of claim 11 wherein the vibration parameter is comprised of the vehicle speed, and wherein the vibration threshold is comprised of a high-speed threshold which is larger than the slow-speed threshold.

14. The method of claim 13 wherein the high-speed threshold has a value within a range of 35 mph to 45 mph.

15. The method of claim 11 wherein the vibration parameter is comprised of an ambient temperature, and wherein the vibration threshold is comprised of a temperature threshold.

16. The method of claim 15 wherein the temperature threshold has a value within a range of 85° F. to 95° F.

17. The method of claim 11 wherein the vibration parameter is comprised of a vertical acceleration of the vehicle, and wherein the vibration threshold is comprised of an acceleration threshold.

18. The method of claim 17 wherein the acceleration threshold has a value within a range of 1.3 m/s$^2$ to 1.7 m/s$^2$.

* * * * *